(12) United States Patent
Chen et al.

(10) Patent No.: US 6,801,209 B1
(45) Date of Patent: Oct. 5, 2004

(54) METHOD AND APPARATUS FOR STORING DATA IN A BLOCK-BASED MEMORY ARRANGEMENT

(75) Inventors: Yen-Kuang Chen, Franklin Park, NJ (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,651

(22) Filed: Dec. 30, 1999

(51) Int. Cl.[7] .............................. G06F 12/06; G09G 5/36
(52) U.S. Cl. ........................ 345/572; 345/557; 711/118
(58) Field of Search .............................. 345/572, 418, 345/544, 557, 564, 530, 501, 566, 565, 568; 711/118, 141, 201, 202, 206, 214

(56) References Cited

U.S. PATENT DOCUMENTS

| | | | | |
|---|---|---|---|---|
| 5,353,426 A | * | 10/1994 | Patel et al. ................. | 711/118 |
| 5,675,826 A | * | 10/1997 | Manze et al. ............... | 345/418 |
| 5,841,446 A | * | 11/1998 | Dai ............................ | 345/565 |
| 6,072,507 A | * | 6/2000 | Balatsos et al. ............ | 345/568 |
| 6,301,652 B1 | * | 10/2001 | Prosser et al. .............. | 712/204 |
| 6,344,852 B1 | * | 2/2002 | Zhu et al. ................... | 345/418 |

* cited by examiner

Primary Examiner—Kee M. Tung
(74) Attorney, Agent, or Firm—Blakely, Sokoloff, Taylor & Zafman LLP

(57) ABSTRACT

A method and apparatus for storing image/video data in a memory device. The method includes receiving an image consisting of a plurality of pixels. In addition, the method includes generating addresses in the memory device for pixels from the image, wherein the memory addresses are generated within memory blocks consisting of multiple rows, wherein each row of the memory block is shorter in length than a full line of the memory device, wherein each memory block is aligned within a boundary of the memory device.

19 Claims, 8 Drawing Sheets

METHOD AND APPARATUS FOR STORING DATA IN A BLOCK-BASED MEMORY ARRANGEMENT

FIELD OF THE INVENTION

The present invention relates computers, and, in particular, for storing data in a block-based memory arrangement.

BACKGROUND OF THE INVENTION

Current memory arrangement for image/video is linear across the image plane as shown in FIG. 1. A cache line typically holds some parts of several basic image blocks. For example, a cache line could one line for four separate basic blocks. On the other hand, a basic image block is typically contained in multiple cache lines. That is, a single basic block could be contained in four separate cache lines.

Cache/memory lines are typically divided into boundaries. In the example illustrated in FIG. 2, the cache/memory lines are sub-divided into 8-byte boundaries. If a memory address corresponds to a boundary line, the memory address is considered an "aligned access". If a memory address does not corresponds to a boundary line it is considered an unaligned access, and can typically take 2.5 times longer to access.

The number of unaligned access is typically high in computer applications. As a result, the memory latency associated with the unaligned accesses creates a bottleneck effect that limits the performance of image/video processing and other applications.

For example, accessing an 8×8 pixel block of image data is essentially equivalent to accessing several cache lines (e.g., at least 8 cache lines in the architecture shown in FIG. 1). Therefore, processing an 8×8 block of image data would require 8 memory accesses as shown in FIG. 3a. However, it is not guaranteed that each access to a block will be 8-byte aligned, as is shown in FIG. 3b. As a result, to access an 8 by 8 block could take up to 16 memory accesses.

SUMMARY OF THE INVENTION

The present invention provides a method and apparatus for storing image data in a memory device. The method includes receiving an image consisting of a plurality of pixels. The method further includes generating addresses in the memory device for pixels from the image, wherein the memory addresses are generated within memory blocks consisting of multiple rows, wherein each row of the memory block is shorter in length than a full line of the memory device.

DETAILED DESCRIPTION

A method and apparatus for storing image/video data in a block-based memory arrangement is disclosed. In the following description, for purposes of explanation, specific nomenclature is set forth to provide a thorough understanding of the present invention. However, it will be apparent to one skilled in the art that these specific details are not required in order to practice the present invention. For example, the size of the memory block as described below is provided as an example. The chosen size of the memory block can vary without departing from the scope of the present invention.

Figure 1:
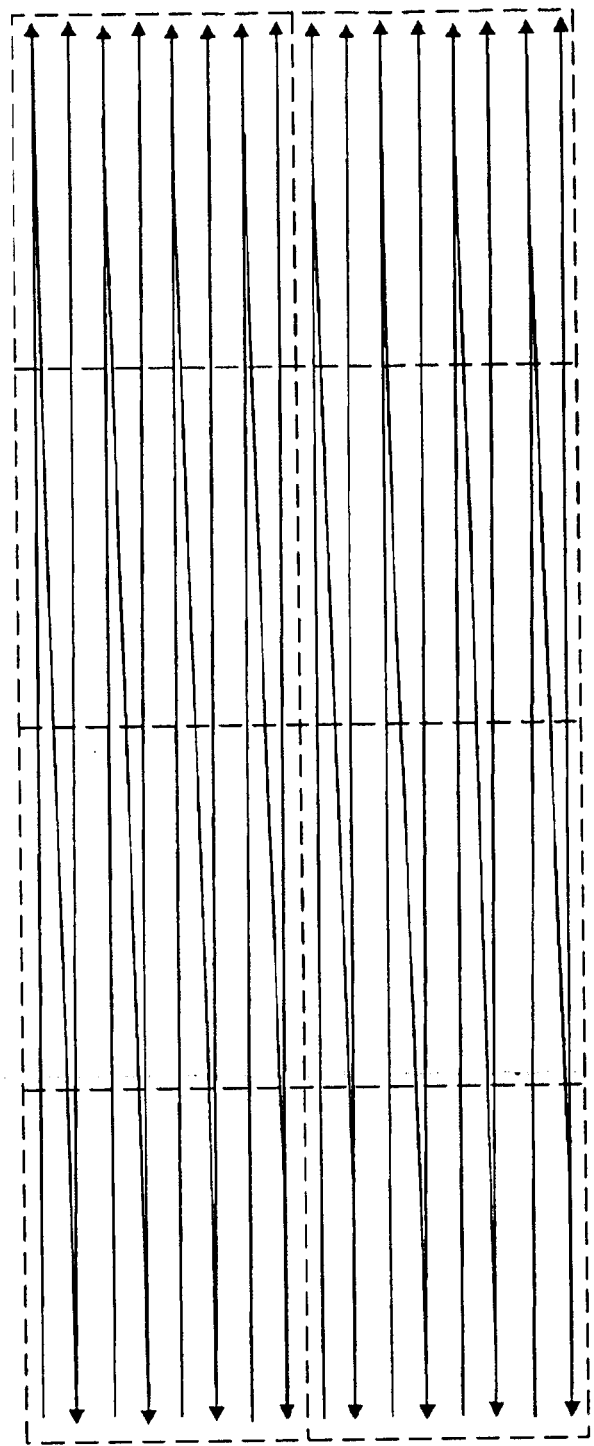
FIG. 1 illustrates memory arrangement for image/video is linear across the image plane.
Figure 2:
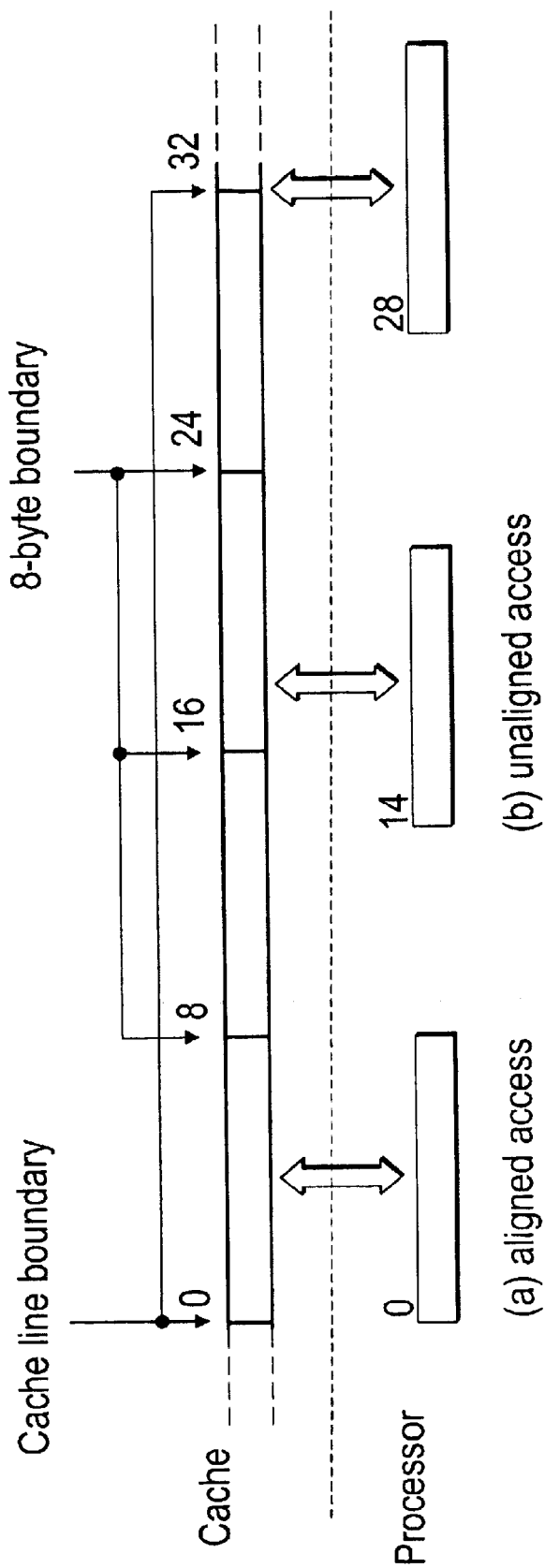
FIG. 2 illustrates memory divided into cache lines and cache-lines sub-divided into quadword boundaries.
Figure 3B:
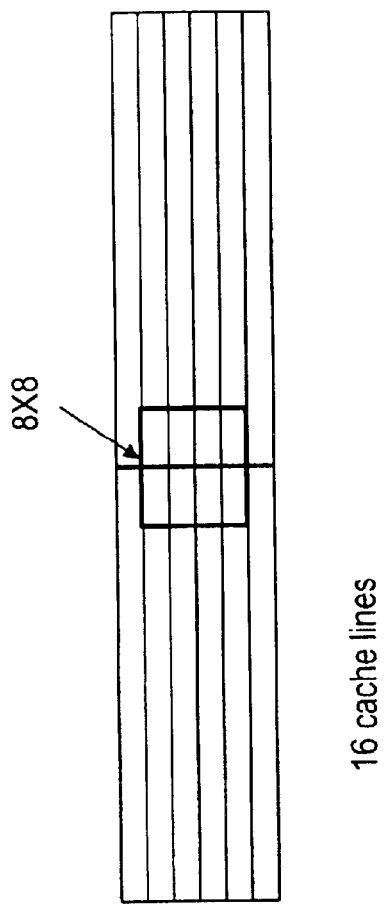
FIGS. 3a–b is a block diagram illustrating accessing data in a linear-mapped memory arrangement.
Figure 3A:
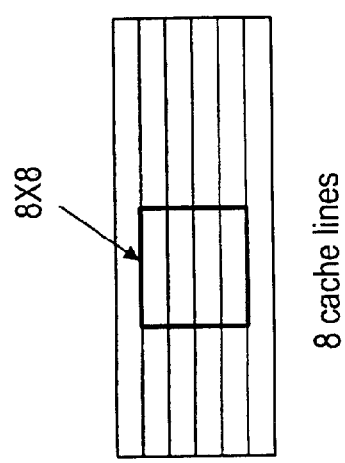

As described in the background, typical memory arrangement for image/video data is linear across the image plane as shown in FIG. 1. Therefore, in the prior art, as shown in FIG. 1, the data is accessed from memory to a cache, one horizontal line of memory at a time. Therefore, if an 8×8 basic image block is stored in memory, with each 8 byte line of the block stored on a separate line of memory, at least 8 memory accesses would be necessary to transfer the block from memory into a cache memory.

Figure 4:
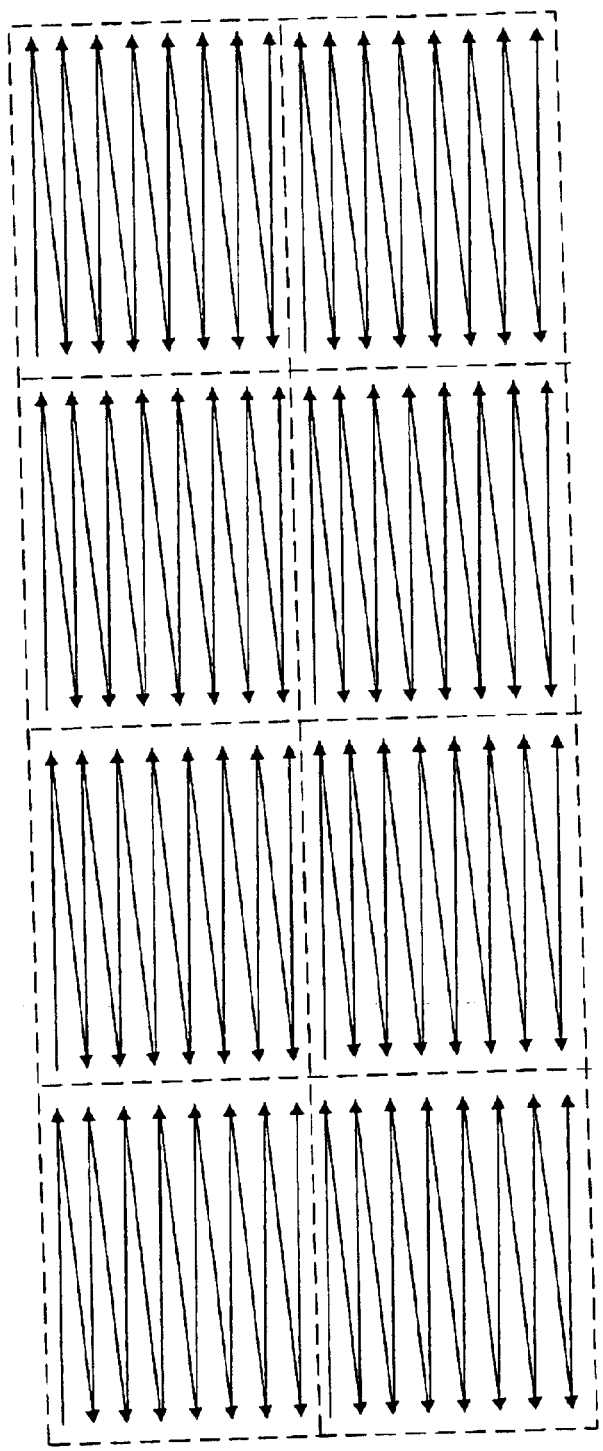
FIG. 4 illustrates a block diagram of the block-based memory arrangement according to one embodiment.

However, as shown in FIG. 4, the present invention provides a method and apparatus for storing image data in block-based arrangement. In one embodiment, the block-based arrangement is achieved by using aligned memory blocks within memory. As a result, in the present invention, data is accessed from memory into a cache memory, in blocks of data (i.e., multiple sub-memory rows per memory access), rather than "one" larger line of memory per memory access.

In one embodiment, each memory block is equal to a basic image block (e.g., 8-pixel/bytes wide and 8-pixel/bytes high). Furthermore, as shown in FIG. 4, each memory block includes a group of multiple sub-lines of memory, with multiple memory blocks provided in a row.

The image data is stored in each memory block by filling a line of a memory block, wrapping around within a memory block, and continuing on a subsequent line of the memory block. When a memory block is full, data is then stored on the first line of the next memory block. The next memory block is the adjacent memory block in the same row, or in the next row if the current row is completed.

In one embodiment, the memory blocks are stored in alignment with alignment boundaries of the memory device. In one embodiment, the starting memory addresses of the aligned blocks are multiples of 32 because a cache line has 32 bytes. Furthermore, in one embodiment, the size of a line of the memory block is equal to the size of a sub-line of the memory device, i.e., 8 bytes. In alternative embodiments, the size of the memory blocks and the lines within the memory blocks may vary without departing from the scope of the present invention.

Accessing an 8×8 byte block of data from memory (as is typical in the case of image processing), in the present invention, could include as little as two memory accesses (in case of the addressed data being aligned with the memory block boundaries having a size of 8×4 bytes).

Figure 5D:
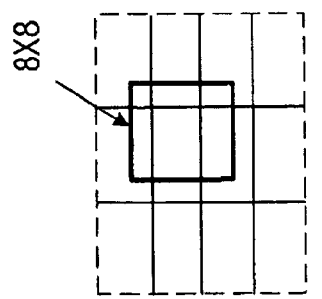
FIGS. 5a–d is a block diagram illustrating accessing data in a block based memory arrangement in accordance with one embodiment.
Figure 5C:
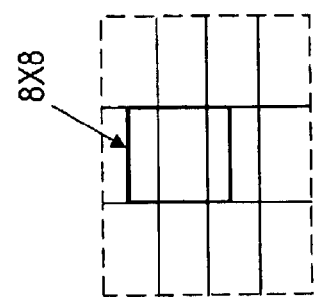
Figure 5B:
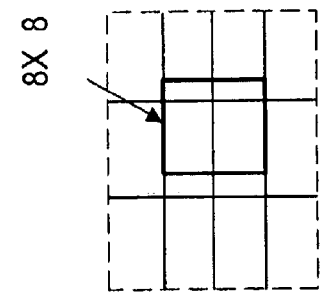
Figure 5A:
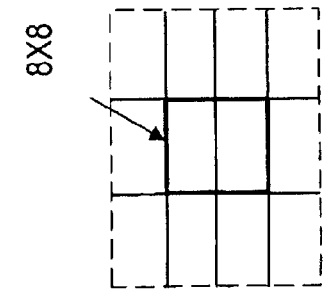

However, even in the case of the addressed data not being aligned with the memory blocks, in the present invention of using memory blocks, accessing the 8×8 byte block should take no more than six cache/memory accesses, as illustrated in FIGS. 5b–5d.

Method for Storing Image Data in a Blocked-Based Memory Arrangement

Figure 6:
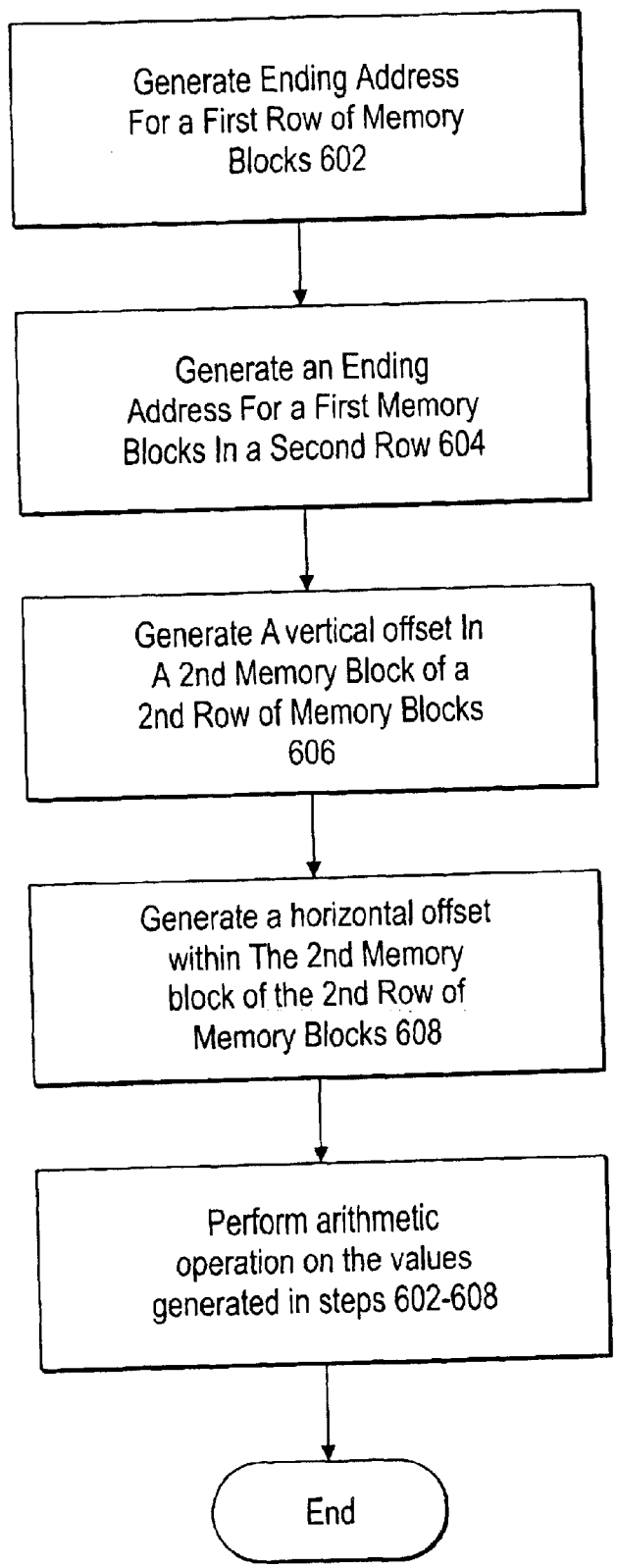
FIG. 6 illustrate a flow diagram describing the steps of storing image data in a block-based memory arrangement according to one embodiment.
Figure 7:
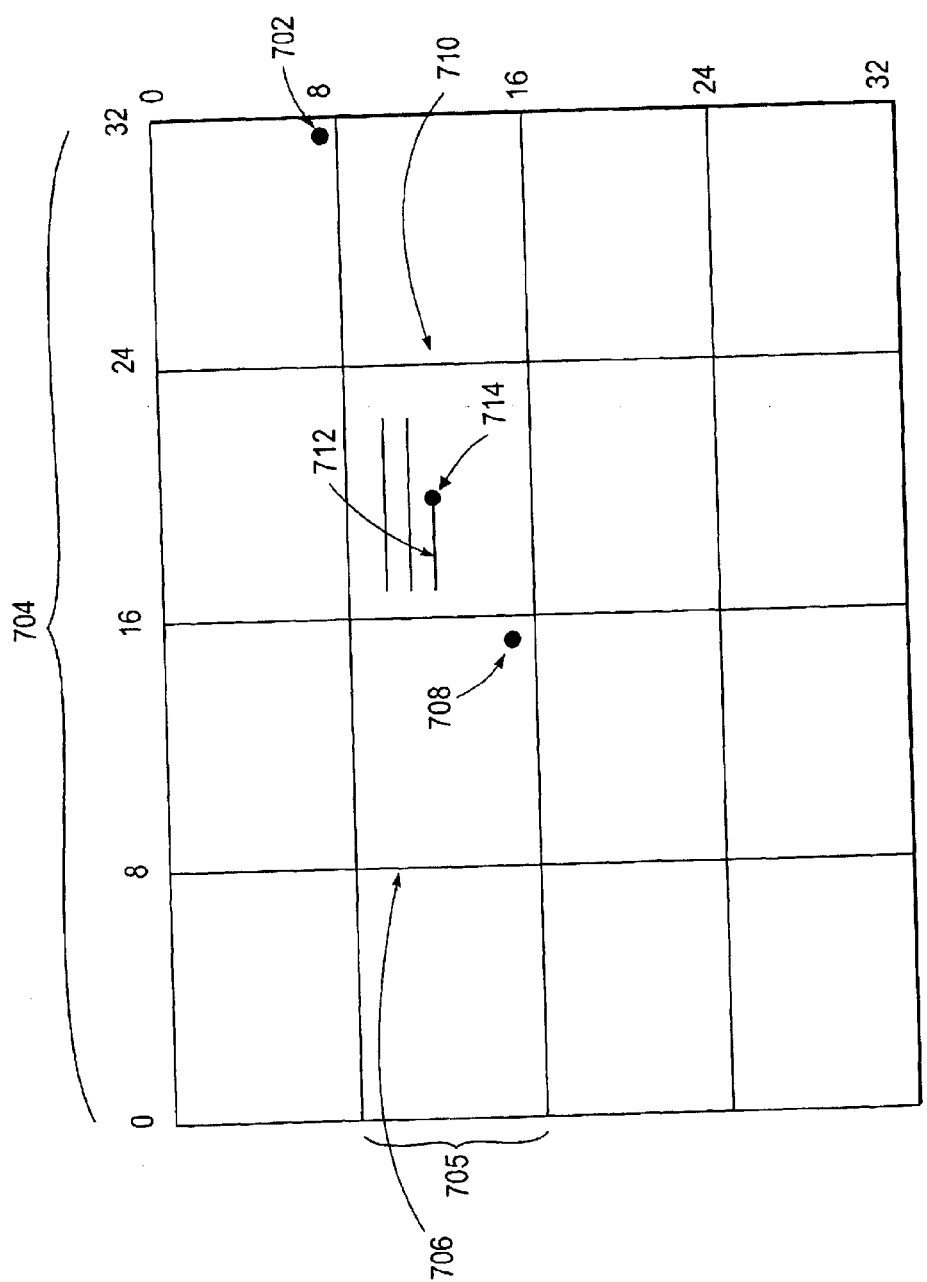
FIG. 7 illustrates a block diagram of the block-based memory arrangement according to one embodiment.

FIGS. 6 illustrate a flow diagram describing the steps for storing image data in memory blocks. The steps described in the flow diagram of FIG. 6 are discussed in correlation to the block diagram of FIG. 7, illustrating block based memory arrangement.

The image data consists of pixels that make up the image. Each pixel includes a vertical and horizontal coordinate (e.g., X and Y) with respect to the vertical and horizontal axis of the image, which indicate the pixel's position within the image. The X and Y coordinates of each pixel to be stored in memory are used in the steps discussed below to generate a memory address.

Moreover, the steps discussed below can be used to store previously generated image data (e.g., video data) that is being accessed from a storage device where it is stored in linear manner, as discussed above. Alternatively, the method can be used to store image data in the memory blocks as the image data is created when processing an application (e.g., a graphics application, a video decoding application).

In step 602, the ending address for the row of memory blocks, which precedes the position of the current pixel to be stored, is generated. For example, in FIG. 7, the position 702 would be the ending address for the row 704 of memory blocks, if the pixel is to be stored in row 705. In one embodiment, the ending address of the preceding row of memory blocks is generated with the Equation 1 shown in table 1 below:

TABLE 1

| [Y/BH] × BH × row_width |
|---|

In Equation 1, Y represents the vertical coordinate of the pixel to be stored, BH represents the height of the memory blocks (e.g., 8 bytes), and the row_width represents the total length of a row of memory blocks in memory. Moreover, the division operation within the brackets represents generating the largest integer smaller than or equal to the result of the division operation (i.e., integer division operation).

In step 604, the ending address 708 is generated for the memory block 706 that is adjacent to the memory block 710 that is to receive the current pixel being stored. In one embodiment, the ending address for the adjacent memory block is generated with Equation 2 shown in table 2 below:

TABLE 2

| [X/BW] × BW × BH |
|---|

In equation 2, X represents the horizontal coordinate of the pixel to be stored, and BW represents the block width of the memory block (e.g., 8 bytes).

In step 606, the vertical offset is generated within the memory block 710 that is to include the current pixel being stored. In one embodiment, the vertical offset is generated with the Equation 3 shown in Table 3 below:

TABLE 3

| (Y − [Y/BH] × BH) × BW |
|---|

(Y−[Y/BH]×BH) is the remainder of the division operation of Y and BH, i.e., the modulus value which can be also denoted as (Y mod BH).

Thereafter, in step 608 the horizontal offset is generated within the memory block 710 that is to include the current pixel being stored. In one embodiment, the horizontal offset is generated with Equation 4 shown in Table 4 below:

TABLE 4

| (X − [X/BW] × BW) |
|---|

In step 610, the values generated by Equations 1–4 are joined by an arithmetic operation to provide the memory address within a memory block 710 for storing the current pixel, in accordance with one embodiment. In one embodiment, the values generated by Equations 1–4 are summed together. In alternative embodiments, the equations and mathematical operations used to generate the memory address for storing the current pixel can vary without departing from the scope of the present invention.

Thereafter, when data is to be accessed from the memory wherein the data is stored in a block-based arrangement, as discussed above, the memory will provide memory block that contains the specified memory address rather than a single line of the memory, as done in the prior art.

Figure 8:
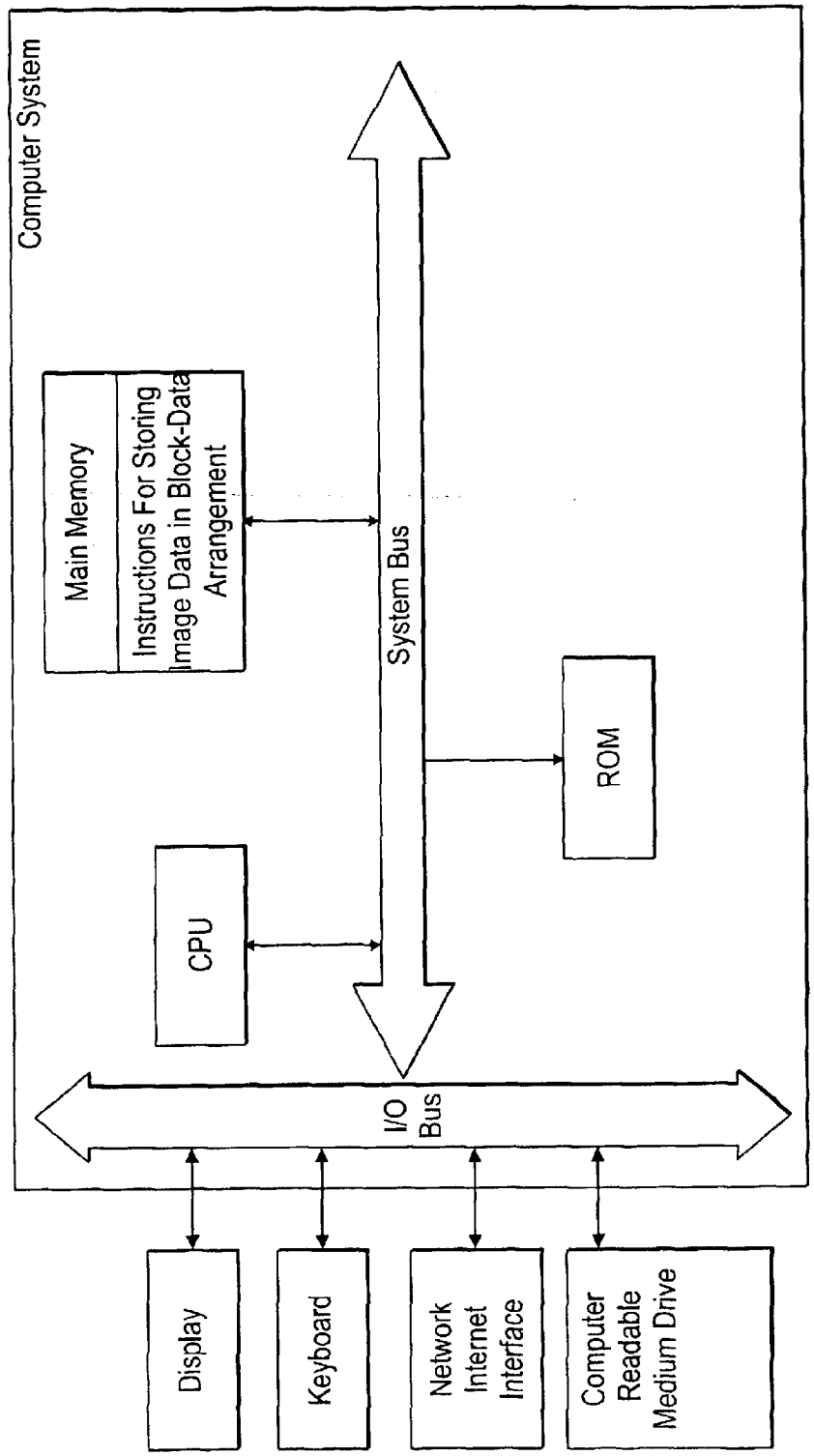
FIG. 8 illustrates a computer system having a computer readable medium with instructions stored thereon according to one embodiment of the present invention.

The method for storing the image data in a block-based memory arrangement as described above can be provided in applications (e.g., video/graphic applications) to potentially increase the performance of the applications by decreasing the time to perform unaligned memory accesses. Moreover, applications that include the method as described above, can be stored in memory of a computer system as a set of instructions to be executed, as shown in the computer system of FIG. 8. In addition, the instructions to perform the methods as described above could alternatively be stored on other forms of computer-readable medium, including magnetic and optical disks. For example, method of the present invention can be stored on computer-readable mediums, such as magnetic disks or optical disks, that are accessible via a disk drive (or computer-readable medium drive), such as the disk drive shown in FIG. 8.

Alternatively, the logic to perform the methods as discussed above, could be implemented in additional computer and/or machine readable mediums, such as discrete hardware components such as large-scale integrated circuits (LSI's), application-specific integrated circuits (ASIC's), firmware such as electrically erasable programmable read-only memory (EEPROM's); and, electrical, optical, acoustical or other forms of propagated signals (e.g., carrier waves, infrared signals, digital signals, etc.)

What is claimed is:

1. A method of storing image data in a memory device comprising:
   receiving an image consisting of a plurality of pixels;
   generating addresses in said memory device for pixels from said image, wherein said memory addresses are generated within memory blocks consisting of multiple rows shorter in length than a cache line boundary, generating said addresses for said pixels includes determining an ending address for a preceding row of memory blocks.

2. The method of claim 1, wherein each memory block corresponds to a block of pixels from said image.

3. The method of claim 1, wherein each memory block is aligned within a boundary of the memory device.

4. The method of claim 3, wherein generating said addresses for said pixels further includes determining an ending address for a first memory block in a second row of memory blocks subsequent to said first row of memory blocks.

5. The method of claim 4, wherein generating said addresses for said pixels further includes determining a first row within a second memory block of said second row of memory blocks.

6. The method of claim 5, wherein generating said addresses for pixel further includes determining a horizontal offset within said second row of the second memory block.

7. The method of claim 6, wherein generating said addresses for said pixels further includes performing an arithmetic operation to join said ending address of said first row of memory blocks, said ending address of said first memory block of said second row of memory blocks, said ending address of said first row within said second memory block of said second row of memory blocks, and said horizontal offset with said second row of the second memory block of the second row of memory blocks.

8. The method of claim 7, wherein said performing said arithmetic operation to join said addresses and offsets includes generating a sum of said addresses and offsets.

9. The method of claim 1, wherein generating said addresses for said pixels includes determining an ending address for a first row of memory blocks.

10. A method of storing image data in a memory device comprising:

receiving an image consisting of a plurality of pixels;

arranging pixels from said image into said memory device, wherein said pixels are stored into a two-dimensional array of memory blocks, each memory block corresponds to a block of pixels from said image, said memory blocks include multiple rows shorter in length than a cache line boundary, and each memory block is aligned with a boundary of the memory device, arranging said pixels includes determining an ending address for a preceding row of memory blocks.

11. A computer-readable medium having stored thereon a set of instructions, said set of instruction for storing image data in a memory device, which when executed by a processor, cause said processor to perform a method comprising:

receiving an image consisting of a plurality of pixels;

generating addresses in said memory device for pixels from said image, wherein said memory addresses are generated within memory blocks consisting of multiple rows shorter in length than a cache line boundary, generating said addresses for said pixels includes determining an ending address for a preceding row of memory blocks.

12. The computer-readable medium of claim 11, wherein each memory block corresponds to a block of pixels from said image.

13. The computer-readable medium of claim 11, wherein each memory block is aligned within a boundary of the memory device.

14. The computer-readable medium of claim 11 wherein generating said addresses for said pixels includes determining an ending address for a first row of memory blocks.

15. The computer-readable medium of claim 14 wherein generating said addresses for said pixels further includes determining an ending address for a first memory block in a second row of memory blocks subsequent to said first row of memory blocks.

16. The computer-readable medium of claim 15, wherein generating said addresses for said pixels further includes determining a first row within a second memory block of said second row of memory blocks.

17. The computer-readable medium of claim 16, wherein generating said addresses for pixel further includes determining a horizontal offset within said second row of the second memory block.

18. The computer-readable medium of claim 17, wherein generating said addresses for said pixels further includes performing an arithmetic operation to join said ending address of said first row of memory blocks, said ending address of said first memory block of said second row of memory blocks, said ending address of said first row within said second memory block of said second row of memory blocks, and said horizontal offset with said second row of the second memory block of the second row of memory blocks.

19. The computer-readable medium of claim 18, wherein said performing said arithmetic operation to join said addresses and offsets includes generating a sum of said addresses and offsets.

* * * * *